Feb. 16, 1943.　　C. T. McGILL ET AL　　2,310,978
AUTOMATIC VALVE OPERATING MECHANISM
Filed May 29, 1939　　8 Sheets-Sheet 1
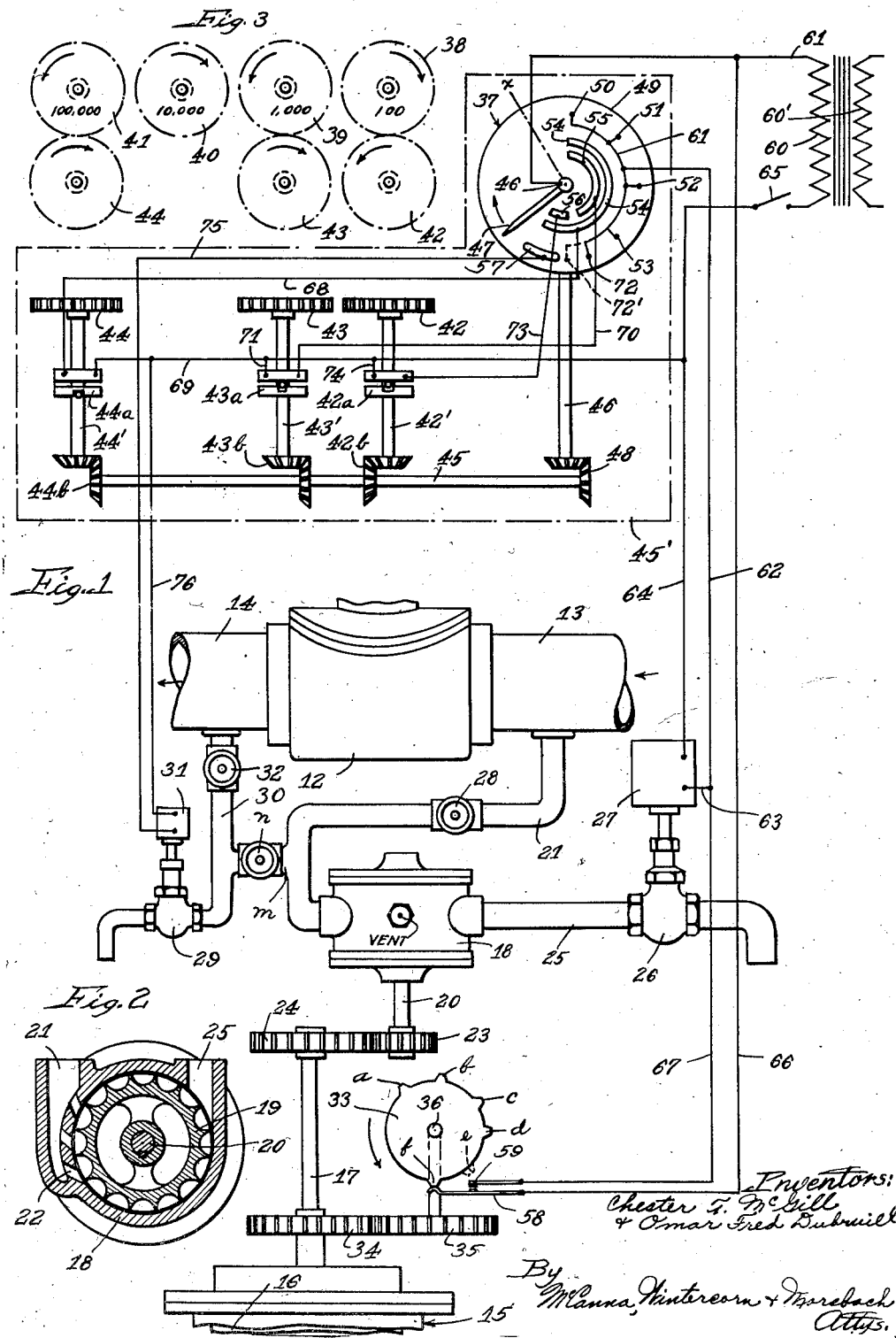

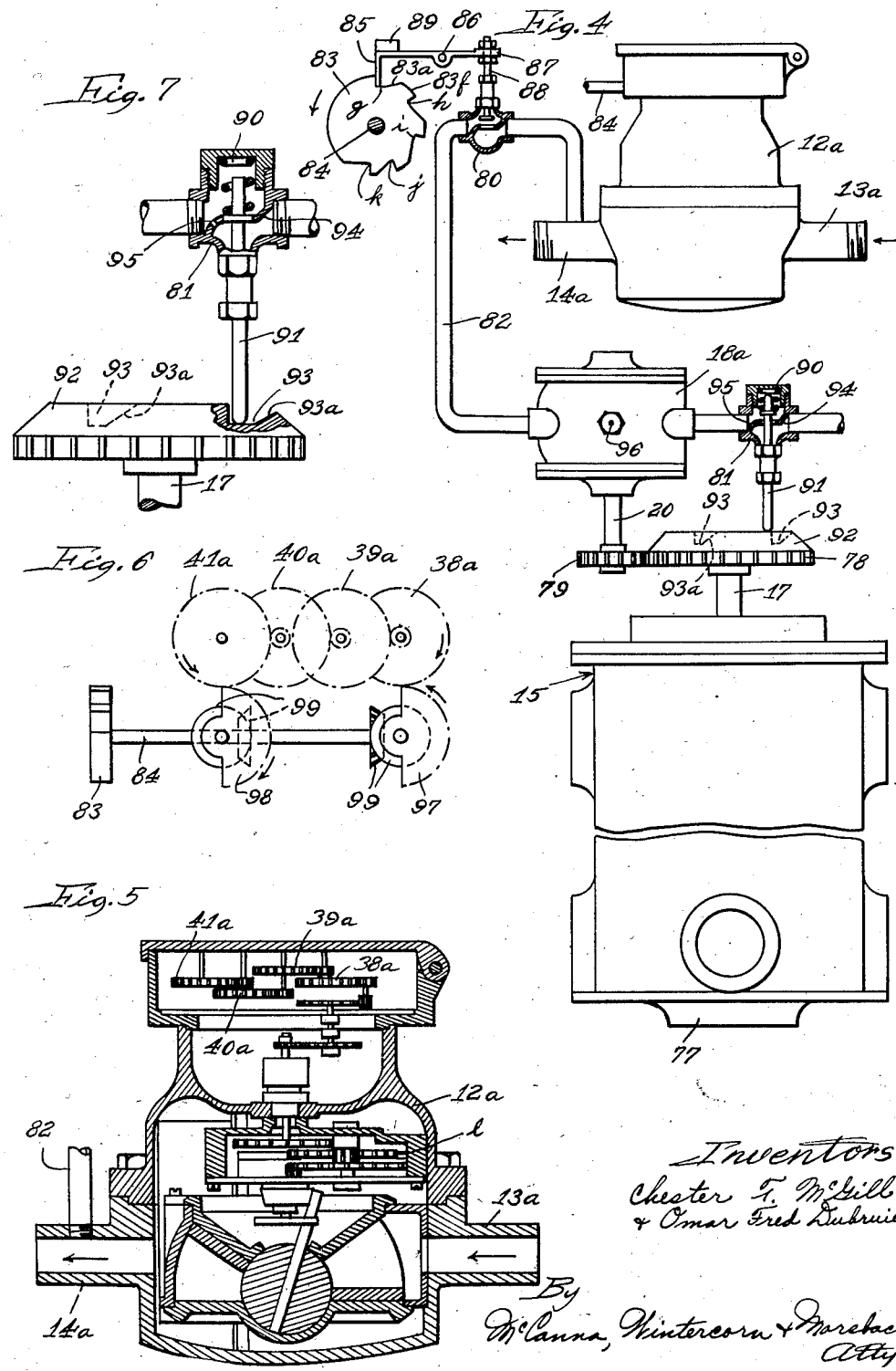

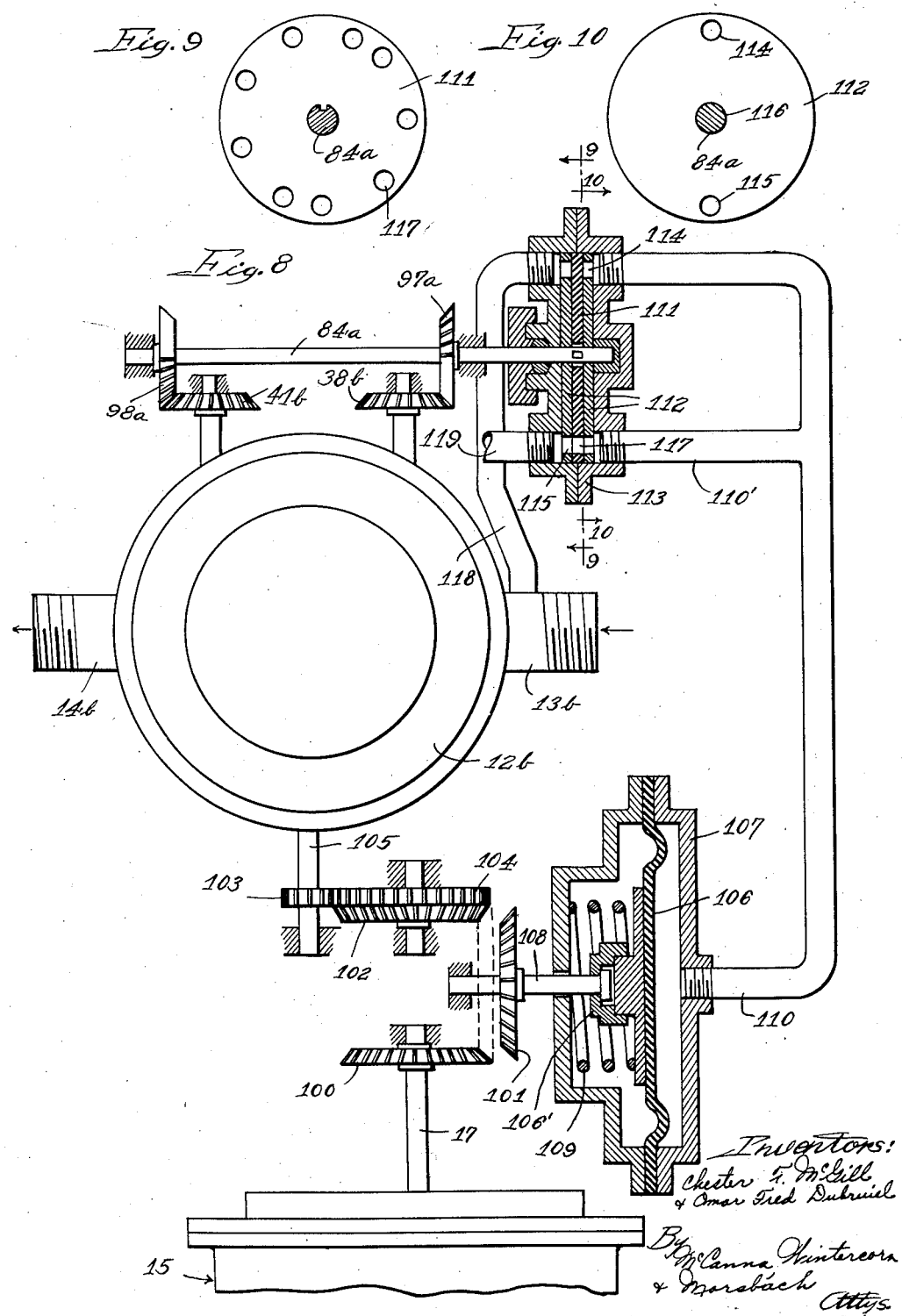

Feb. 16, 1943.      C. T. McGILL ET AL      2,310,978
AUTOMATIC VALVE OPERATING MECHANISM
Filed May 29, 1939      8 Sheets-Sheet 8

Inventors.
Chester T. McGill
& Omar Fred Dubruiel
By
McCanna, Wintercorn & Morebach
Attys.

Patented Feb. 16, 1943

2,310,978

UNITED STATES PATENT OFFICE 2,310,978

AUTOMATIC VALVE OPERATING MECHANISM

Chester T. McGill and Omar Fred Dubruiel, Elgin, Ill., assignors to Elgin Softener Corporation, Elgin, Ill., a corporation of Illinois Application May 29, 1939, Serial No. 276,296

34 Claims. (Cl. 210—24)

This invention relates to automatic valve operating mechanisms.

The principal object of our invention is to provide in conjunction with a multi-port valve or valves for controlling a water softener, filter, or the like, an automatic mechanism for operating the valve from one position to another, each operation being caused to occur only after a predetermined amount of water has been passed through the unit to which the valve is attached.

We are aware of various meter-controlled valve operating mechanisms proposed heretofore, and believe that none of them were commercially successful because of their complicated and expensive construction and the fact that most of them are not reliable. In some instances, the duties imposed upon the meter were far beyond its capacity, and, as a result, such mechanisms were either entirely impractical or, if at all operative, were unsatisfactory because of the load imposed upon the meter affected its accuracy too much. In the mechanisms of our invention, these objections have been avoided by our improvements.

In accordance with one phase of our invention, the meter operates a selector switch through the medium of which a solenoid operated valve is controlled so as to control the starting and stopping of a hydraulic motor connected to operate the valve mechanism. This therefore relieves the meter of any actual or perceptible load, so that the meter can be relied upon to measure accurately the flow of water and accordingly operate the valve mechanism at the proper points in the cycle. A special feature of this form of our invention is the provision of electromagnetically controlled clutches controlled from the selector switch so as to connect and disconnect the register gears of the meter from the selector switch shaft to operate the selector switch slowly through one portion of a complete turn for one portion of the cycle and at a faster rate through the rest of the turn for the other portion of the cycle. Another feature of this form of our invention which makes it adaptable to use on double softener installations where one softener is in use while the other is regenerated and vice versa is the provision of a second solenoid operated valve which in the final stage of the capacity run of the softener that is operating will be opened to allow flow through the meter of the idle softener to the drain to cause the valve mechanism of the idle softener to be moved from an off position to softening position so that this idle softener will be thrown into operation jointly with the other softener during the final stage of its capacity run and will thereafter operate by itself while the first softener is being regenerated.

In accordance with another phase of our invention, the meter measuring the flow of water through the unit has its register gears connected to two sector gears on a control shaft so as to turn the control shaft slowly through one portion of a complete turn for one portion of the cycle and at a faster rate through the rest of the turn for the balance of the cycle, the control shaft serving to turn a cam for operating a pilot valve at predetermined intervals to control the starting of a hydraulic motor connected to operate the valve mechanism. A second valve in the same pipe with the pilot valve and hydraulic motor, but on the opposite side of the motor from the pilot valve, is operated by another cam turned with the valve mechanism whereby to stop the motor when the valve mechanism reaches predetermined positions. A special feature of this valve operating mechanism is the provision of bleeder and vent openings for draining water from the pipe and motor during the intervals between the operations of the valve mechanism by the hydraulic motor so as to provide sufficient space in the pipe and motor so that upon the subsequent opening of the pilot valve, the rotor of the hydraulic motor will be free to turn at least enough to open the other valve that controls the stopping of the motor and thus permit operation of the valve mechanism by the motor through the next stage of the cycle. In still another embodiment using the two valves mentioned, we have provided a novel hydraulic means for positively throwing the sector gears into and out of mesh at the proper points in the cycle, the hydraulic means being under control of another valve operated by the meter with the pilot valve.

In accordance with still another phase of our invention, the meter has two sector gears operated by register gears to turn a control shaft slowly through one portion of a complete turn for one portion of the cycle and at a faster rate through the rest of the turn for the rest of the cycle, and this control shaft turns a control disk for admitting hydraulic or fluid pressure to a diaphragm pressure chamber from the supply pipe communicating with the meter, whereby to connect the valve mechanism at those intervals with its operating means, there being a gear shiftable by means of the diaphragm so as to connect the valve mechanism to its operating means whenever the diaphragm is subjected to pressure. In this valve operating mechanism, the control disk also controls the release of pressure from the diaphragm chamber so that the operation of the valve mechanism will be interrupted at the proper points.

The invention is illustrated in the accompanying drawings, in which—

Fig. 1 is a diagrammatic view illustrating a meter controlled, valve operating mechanism made in accordance with our invention;

Fig. 2 is a cross-section through the hydraulic motor;

Fig. 3 is a face view of the register gears of the meter, showing the gears meshed therewith for controlling the valve operating mechanism;

Fig. 4 is a diagrammatic view of another valve operating mechanism made in accordance with out invention;

Fig. 5 is a sectional view through the meter to illustrate the register gears;

Fig. 6 is an isolated plan view of the sector gears of Fig. 5 showing diagrammatically the connection of the sector gears with these register gears;

Fig. 7 is an enlarged fragmentary sectional view showing the shut-off valve of Fig. 4 in a closed position;

Fig. 8 is another diagrammatic view of another valve operating mechanism made in accordance with our invention;

Figure 11A:
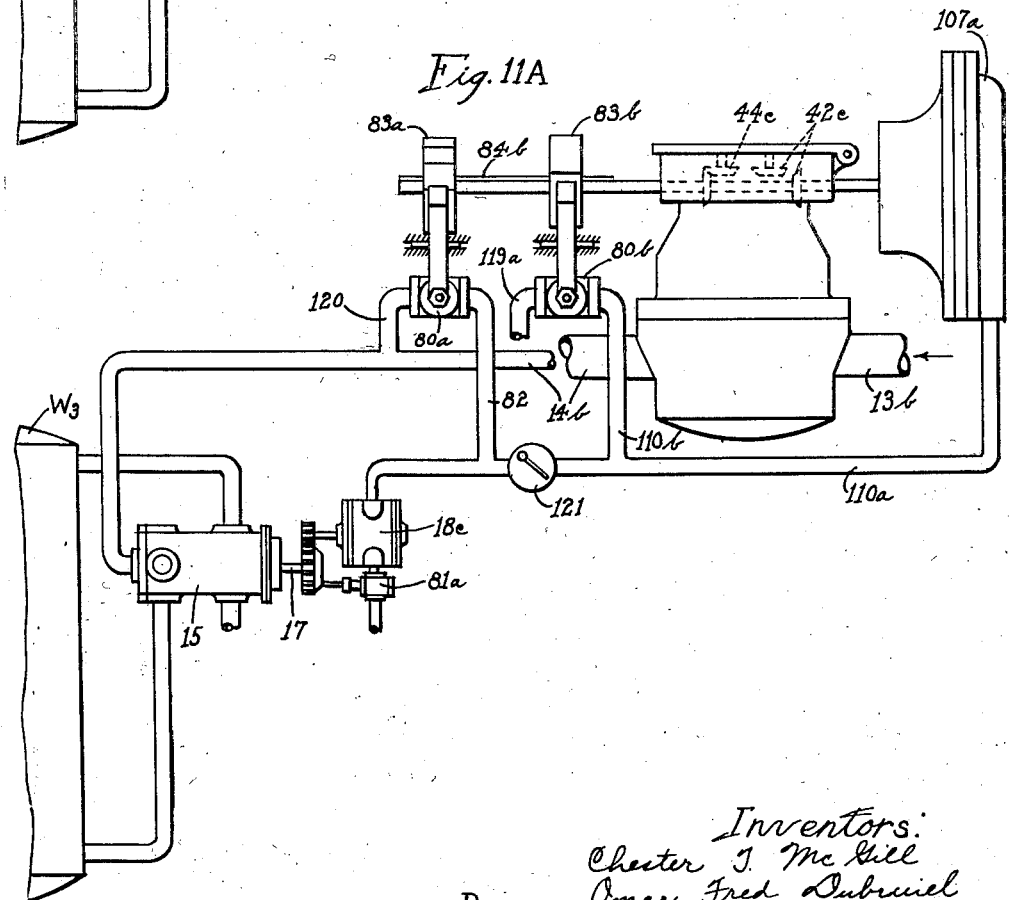
Figure 8A:
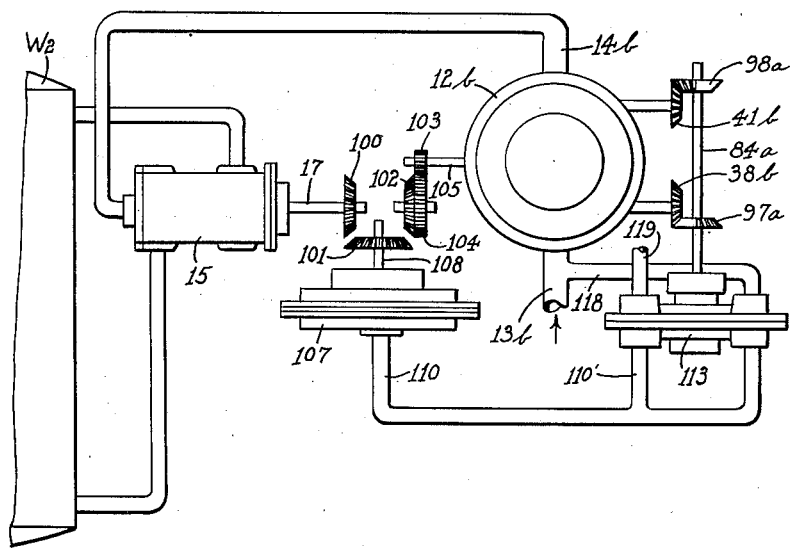
Fig. 8A is another more or less diagrammatic view of the mechanism of Fig. 8, shown in connection with a water treating system.
Figure 11:
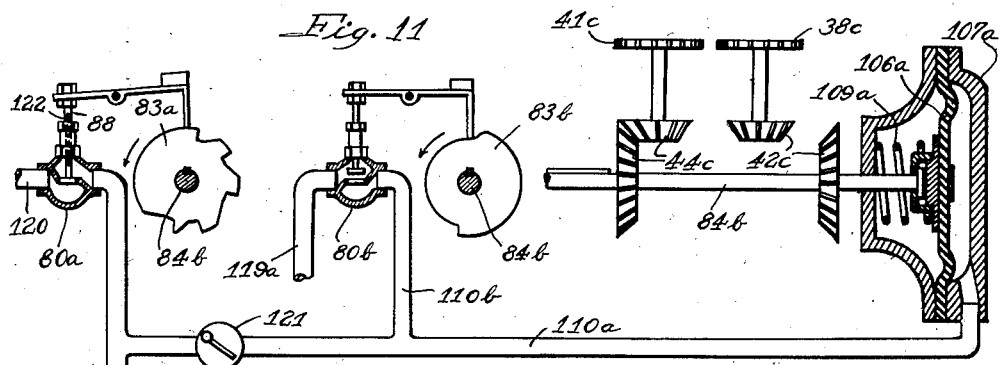
Figure 12:
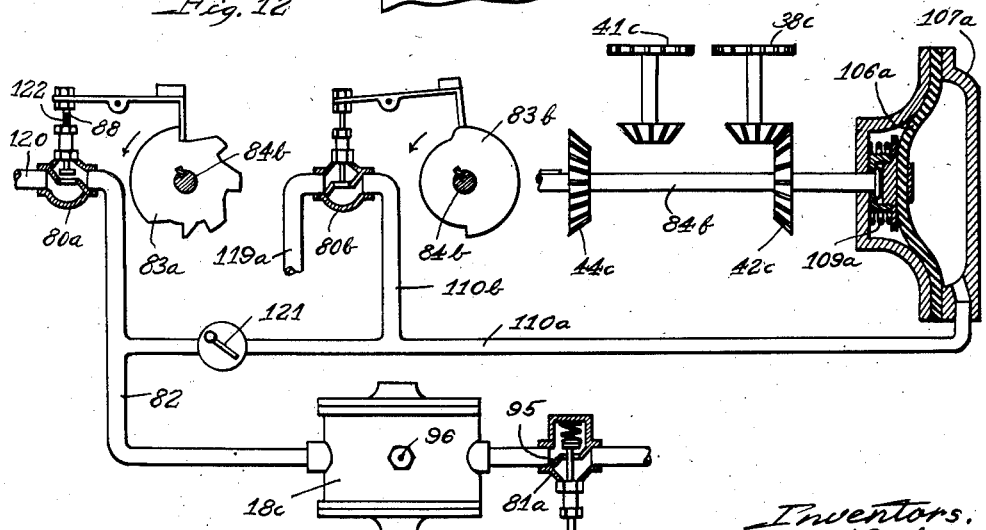

Figs. 9 and 10 are face views of the rotary and stationary disks forming parts of the meter operated control means, these views being taken on the lines 9—9 and 10—10 of Fig. 8, respectively;

Figs. 11 and 12 are other diagrammatic views of a still further embodiment of our invention, showing the parts in two different stages of a cycle of operation, and Fig. 11A is another more or less diagrammatic view of the mechanism of Fig. 11, shown in connection with a water treating system.

Similar reference numerals are applied to corresponding parts throughout the views.

Referring first to Figs. 1 to 3, the reference numeral 12 designates a meter inserted between the pipes 13 and 14 in a supply line extending to a water softener, filter, or other unit W, connected with and controlled by the valve mechanism 15, the operation of which is to be controlled by the meter 12, in accordance with our invention. The valve mechanism 15 is similar to the valve forming the subject matter of our copending application Serial No. 264,356, filed March 27, 1939, the same being a multi-port valve having a piston type rotor 16 rotatable by means of a stem 17 in the stator. In the case of a water softener, filter, or the like, the meter 12 registers the water flowing through the unit, so that when an amount equivalent to the capacity of the unit has been passed through it, the valve means 15 will be operated automatically from service position to the first of the one, two, or more, other positions in the cycle for which the valve means 15 is designed and adapted. Thus, in the case of a base exchange water softener, which is what the valve means 15 is herein intended to be connected with, the valve will be shifted from service position, first, to a first backwash position, then to a second backwash position, then a brining position, and finally a rinsing position. All of these operations are fully illustrated and described in our copending application mentioned above. A hydraulic motor 18 containing an impeller 19 keyed on the shaft 20, as shown in Fig. 2, is arranged to be supplied with water from the supply pipe 13 through an inlet connection 21, the water being delivered from this connection nearly tangentially with respect to the rotor 19 through holes 22, as shown in Fig. 2, for best mechanical advantage. Sufficient torque is thus applied to the shaft 20 to turn the rotor 16 of the valve 15, especially when reduction gears, as are indicated at 23 and 24, are provided. The outlet connection 25 from the hydraulic motor leads to the drain, and there is a solenoid operated valve 26 in this outlet connection, the opening and closing of which serves to control the starting and stopping of the valve 15. At 27 is indicated a solenoid coil, the energization of which, in the manner hereinafter described, causes the opening of the valve 26, the valve being arranged to close automatically when the circuit through the coil 27 is broken. The valve 28 in the inlet connection 21 is a shut-off valve.

Figure 1A:
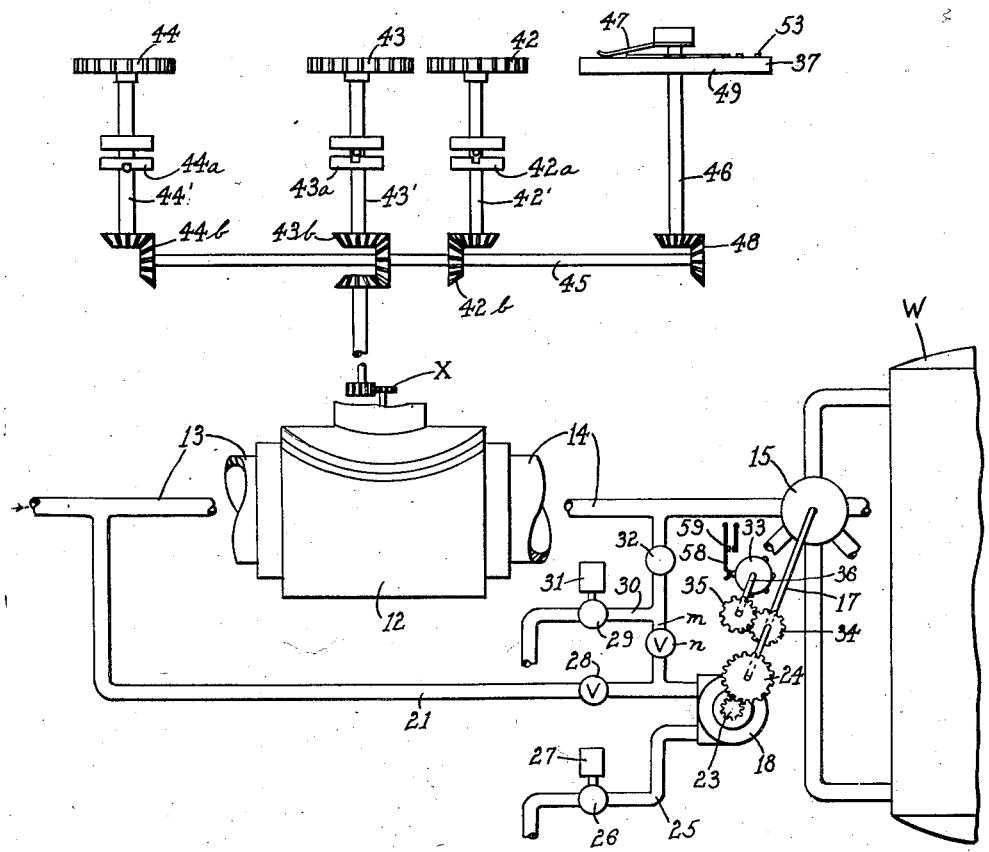
Fig. 1A is another more or less diagrammatic view of the mechanism of Fig. 1, shown in connection with a water treating system.
Figure 3A:
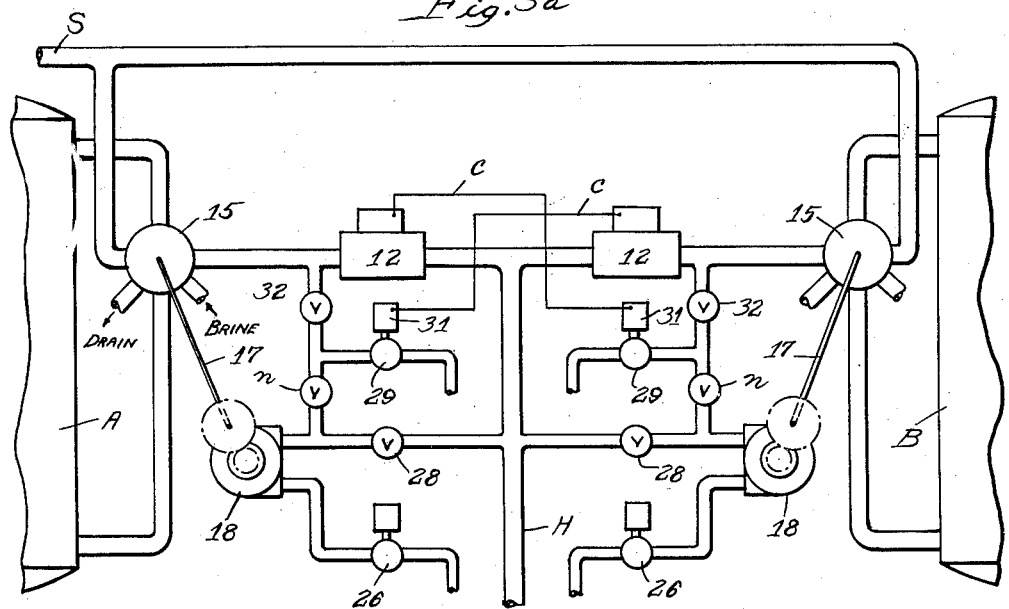
Fig. 3a is a diagram of a double softener installation illustrating application of the mechanism of Fig. 1 thereto.

We illustrate in Figs. 1 and 1A another solenoid operated valve 29 in a discharge pipe 30 communicating with the supply pipe 14 on the opposite side of the meter 12 from the pipe 13, this valve having a solenoid coil 31 which when energized opens the valve similarly as in the case of the solenoid operated valve 26 previously mentioned, the valve otherwise remaining closed. The valve 32 like the valve 28 is arranged to be closed by hand when desired. However this second solenoid operated valve 29 will ordinarily not be used in a single tank softener or even in a double tank upflow-downflow softener installation, but only in a double unit softener or filter installation as illustrated in Fig. 3a where one softener or filter is usually idle while the other is in operation, and then while the latter is being regenerated the former is used, and so on, as hereinafter more fully described. The main object in illustrating the valve 29 in Figs. 1 and 1A is to illustrate better the mode of operation so that the operation of the double unit of Fig. 3a may be more easily understood.

We have also illustrated in Figs. 1 and 1A a cross connection m between the pipes 21 and 30 with a hand valve n for opening and closing communication between the pipes 21 and 30. With this arrangement we are enabled to meter the water going to the motor 18 in operating the valve 15, or not, as desired. Thus when the water going to the motor 18 is not to be metered, the valve n will be closed and the valve 28 opened, whereas when the water going to the motor 18 is to be metered, valve 28 will be closed and valve n opened.

In accordance with our invention, the solenoid coil 27 is arranged to be energized when a predetermined amount of water has passed through the meter 12, whereby to start the operation of the valve 15. When the valve 15 has been turned through a certain angularity, the circuit through the coil 27 is arranged to be automatically interrupted so as to leave the valve in the adjusted position until another predetermined amount of water has passed through the meter, whereupon the coil 27 is again energized for a second operation of the valve, its operation being again stopped by automatic interruption of the circuit through the coil 27, leaving the valve in a second new position. Finally, after several such operations of the valve 15—four in the present case, one for first backwash, the second for second backwash, the third for brining, and the fourth for rinsing, as indicated by the projections a, b, c, and d on the interrupter disk 33— the valve will in the case of a double unit installation of the type shown in Fig. 3a be left in an off position when the circuit for the coil 27 is interrupted by the fifth projection shown in dotted lines at e (Fig. 1) and will not be turned to the service position for the start of the next cycle until sometime later when, as hereinafter described, the other softener or filter of the double unit is nearly exhausted. At that time the selector switch 37 on the meter of the nearly exhausted softener or filter completes a circuit through the coil 31 of the valve 29 on the other softener or filter so that the valve 29 will open and allow flow of water through the meter associated therewith and thereby cause the selector switch 37, that is operated by that meter, to move from the off position identified with the projection e of the interrupter disc 33. In that way a circuit is completed through the solenoid 27 of the valve 26 associated with the softener or filter in question so as to have the valve 15 of the device operated from the off position to service position, the valve being left in service position when the projection f of the interrupter disk 33 breaks the circuit through the coil 27. In a single unit or in a two tank upflow-downflow unit where the valve 15 has no off position, the projection e on the interrupter disk 33 will be omitted. That is the reason it is shown in dotted lines in Fig. 1. When this projection e is omitted, the valve 15 moves from the rinse position identified with projection d directly to the softening position identified with projection f. Also in a unit of the kind just mentioned, assuming a valve 29 were provided, it will have the coil 31 energized at the end of the rinse operation to allow water to flow through the meter 12 directly to the drain through the valve 29 instead of going through the softener or filter unit, in order to index the selector switch 37 that is operated by the meter to the service position for the commencement of the capacity run, the coil 27 of the valve 26 being at the same time energized so as to allow water to flow through the motor 18 to operate the valve 15 from rinse position to service position. The interrupter disk 33 is arranged to be turned with the rotor 16 of the valve 15 through the medium of gears 34 and 35, the gear 35 being connected with the disk 33 in any suitable manner, as by means of shaft 36. The circuits through coils 27 and 31 are completed by the selector switch 37 which is operated from the register gears 38—41 of the meter 12 through the medium of three gears 42—44, the gear 42 being meshed with the 100 gallon register gear 38, the gear 43 being meshed with the 1,000 gallon register gear 39, and the gear 44 with the 100,000 register gear 41, as indicated diagrammatically in Fig. 3. The box indicated by the dotted line enclosure 45' in Fig. 1, containing selector switch 37 and the three gears 42—44, just mentioned, and their operating connections with the switch 37, may be taken as a diagrammatic representation of the upper portion of the meter 12, that is shown as broken away in Figs. 1 and 1A, to avoid duplication of this meter portion in this view. The driving connection between the meter 12 and the register gears is indicated at x in Fig. 1A. The register gears 38—41, appearing in Fig. 3, are usually housed in the upper portion of the meter, and in accordance with our invention, the gears 42—44 are added to transmit drive to the selector switch 37. The shafts 42'—44', appearing in Fig. 1, are arranged to be driven from the gears 42—44, respectively, when the clutches 42a—44a, respectively, are engaged. These clutches are of an electromagnetic type, the clutches 42a and 43a being alike from the standpoint that they are arranged normally to be disengaged, as indicated by the spaces between the sections thereof and to be engaged only upon energization of the coils thereof, whereas the clutch 44a is of the opposite type, the same being normally engaged but arranged to be disengaged upon energization of the coil thereof. Such clutches are well known and generally available on the market, so that no other illustration or detailed explanation of the construction thereof is considered necessary. The shaft 45 is arranged to be driven selectively by either one of the gears 42—44 upon engagement of their clutches, the drive being transmitted from the shafts 42'—44' to the shaft 45 through pairs of bevel gears indicated at 42b—44b, respectively. The gears 42b, it will be noticed, are reversed in relation to the gears 43b—44b to provide for the driving of the shaft 45 always in one direction, regardless of the fact that the gear 42, as shown in Fig. 3, turns in the opposite direction from the gears 43 and 44. The shaft 46 connected to the rotating arm 47 of the selector switch 37 is driven from the shaft 45 through bevel gears 48. The arm 47 turns relative to a disk 49 of insulation material on which are circumferentially spaced but interconnected contacts 50—53 and 72 and arcuate contacts 54—57, all arranged to be engaged by the arm 47 in different positions in the turning thereof. Now, of course, during the softening operation, the arm 47 will turn very slowly in a clockwise direction, as indicated by the arrow, because during this operation the drive therefor is transmitted from the gear 44 meshing with the 100,000 gallon register gear 41. None of the clutches 42a—44a is energized during this capacity run, the clutch 44a being normally engaged, as previously stated. There is therefore no current consumed except during the relatively brief period of regeneration in which, first, the clutches 43a and 44a are energized to disengage the clutch 44a and engage the clutch 43a, and later to energize the clutches 42a and 44a so as to keep the clutch 44a disengaged while the clutch 42a is engaged, all as will soon appear. Obviously, when the clutch 42a is energized and accordingly engaged, the arm 47 is moved at a much more rapid rate than during the softening operation, the register gear 38 being the 100 gallon gear and having a 1,000 to 1 reduction ratio relative to the gear 41. When the arm 47 is turned through the medium of the gear 43, it will obviously turn slower than when driven by the gear 42, inasmuch as the gear 38 has a 10 to 1 reduction ratio relative to the gear 39.

In operation, when the softener connected with the valve 15 has completed its capacity or service run, the arm 47 of the selector switch 37 will engage the point contact 50 and the contacts 54 and 55 to energize electromagnetic clutches 43a and 44a and thereby engage clutch 43a and simultaneously disengage clutch 44a, while at the same time energizing the solenoid coil 27 to open the valve 26 and allow the valve 15 to be operated by the hydraulic motor 18. The valve moves through approximately 135° in a clockwise direction in this first operation, going from softening position to the first backwash position and, since gears 34 and 35 have a one to one ratio, the interrupter disk 33 is accordingly moved in a counter-clockwise direction through 135°, namely until the projection a arrives where f is shown. When the projection a arrives at the lower dead center position, it deflects the spring switch blade 58 so as to open the contacts 59 and break the circuit through the solenoid coil 27 and thereby automatically close the valve 26 to stop the valve 15 in the first backwash position. The circuit established when arm 47 engages point contact 50 at the commencement of the regeneration cycle, in so far as coil 27 and contacts 59 are concerned, as appears in Fig. 1, is as follows: From one side of the secondary winding 60 through the conductor 61 to arm 47, point contact 50, conductors 61—63 to one side of coil 27, and thence through conductor 64 and line switch 65, which will be normally left closed, back to the other side of the secondary winding 60. The moment the coil 27 is energized and valve 26 opens, allowing flow of water from the supply line 13 to the drain, the hydraulic motor 18 operates and turns the rotor 16 of the valve 15, and accordingly the interrupter disk 33 starts turning in a counter-clockwise direction as indicated by the arrow. The moment the projection f leaves the switch blade 58, contacts 59 close, thereby completing a parallel circuit through the coil 27 so that the coil 27 does not have to rely upon continued engagement of the arm 47 with the point contact 50, but will remain energized after the arm 47 passes point contact 50 and until projection a engages switch blade 58 and opens contacts 59. The parallel circuit established through contacts 59 is through conductor 66 connected to one side of the secondary winding 60, contacts 59, and conductors 67 and 63 to one side of the coil 27, and through conductor 64 to the other side of the secondary winding 60. The circuit in so far as the clutches 43a and 44a are concerned is as follows: From conductor 61 and arm 47 to contacts 54 and 55, and thence from contact 54 through conductor 68 to one side of the coil of clutch 44a, and then through conductor 69 to conductor 64 back to the other side of the secondary winding 60. A parallel circuit is established through the coil of clutch 43a through conductor 70 to one side of the coil and then to conductor 71 which connects with conductor 69, previously mentioned, thereby energizing both coils and causing clutch 44a to be disengaged while clutch 43a is engaged, due to the opposite construction of these clutches. Now, when the clutch 43a is engaged, the arm 47, being turned with the 1000 gallon register gear 39 as compared with its previous slow movement with the 100,000 gallon register gear 41, is arranged to move relatively quickly from point contact 50 to point contact 51 during the first backwash. The meter 12 measures the water flowing through the softener during this backwash, and accordingly advances the arm 47 toward the point contact 51. When enough water has passed through the softener for the first backwash, the arm 47 engages point contact 51 and valve 15 is promptly operated to the second backwash position. There is a brief energization of the coil 27 when the arm 47 engages point contact 51, the circuit through the coil being completed through conductors 62—64 similarly as above described. Immediately upon the opening of the valve 26, caused by the energization of coil 27, the motor 18 starts turning the rotor 16 of the valve 15 through approximately 45° in a clockwise direction to the second backwash position. Here again the contacts 59 maintain the circuit through the coil 27 when the projection a rides off the switch blade 58, and the circuit is maintained until projection b causes disengagement of the contacts 59, thus leaving the valve 15 in second backwash position. Meanwhile it is apparent that the circuits through the coils of clutches 43a and 44a have been left intact. The second backwash flow continues until the arm 47 engages point contact 52, whereupon the coil 27 is again energized long enough to open the valve 26 and allow the motor 18 to start turning the rotor 16 of the valve 15, whereupon the contacts 59 are closed as the projection b rides off the switch blade 58, and in that way the circuit is maintained through the coil 27, keeping the valve 26 open until the projection c causes disengagement of these contacts 59. That occurs when the rotor 16 has been turned through approximately 45° from the second backwash position to brining position. Meanwhile it is again apparent that the circuits through the coils of clutches 43a and 44a are left intact. The brining flow through the softener continues until the arm 47 engages the point contact 53 whereupon the coil 27 is once more energized long enough to open the valve 26 and start the motor 18 operating so as to start turning the rotor 16 of the valve 15 from brining position to rinsing position. As soon as the projection c rides off the switch blade 58 the contacts 59 are closed so that the circuit through the coil 27 is maintained while the rotor 16 is turned through another approximately 45° to the rinsing position at which time the projection d causes disengagement of contacts 59, leaving the valve 15 in rinsing position. The circuits through the coils of clutches 43a and 44a meanwhile are left intact. The rinsing continues until the arm 47 moving in a clockwise direction engages point contact 72, whereupon the coil 27 is again momentarily energized, long enough to open the valve 26 and start the hydraulic motor 18 operating so as to start turning the rotor 16 of the valve 15 through 90° from rinsing position back to softening position. Here again the circuit once established between arm 47 through the coil 27 is maintained by the contacts 59 when the projection d rides off the switch blade 58, so that the valve 26 remains open and the motor 18 continues to operate until the rotor 16 of the valve 15 has been turned through approximately 90° back to softening position, whereupon the projection f causes disengagement of the contacts 59, leaving the valve 15 in softening position. In this last step we have assumed that projection e is omitted and that the valve has no off position. The point contact 72 is therefore the one marking the end of the regeneration cycle. In cases where the valve provided has an off position, as in double unit installations, there is necessity for an extra point contact like that indicated in dotted lines at 72', the contact 72 in such cases being identified with projection e on disk 33 and contact 72' with projection f. Substantially coincident with the engagement by arm 47 with point contact 72, under the conditions previously mentioned, the arm 47 rides off contact 55 and into engagement with contacts 56 and 57, while still maintaining engagement with contact 54. When that occurs the coil of clutch 43a is deenergized causing disengagement of this clutch and the coil of clutch 42a is energized along with the coil of clutch 44a, thereby causing engagement of clutch 42a in place of clutch 43a while the clutch 44a is still kept disengaged. The new circuit established in parallel to the circuit through the coil of clutch 44a is through conductor 73 to one side of the coil of clutch 42a and through conductor 74 to the conductor 69 forming a part of the circuit for the coil of clutch 44a. There is established at the same time the following new circuit: From one side of the secondary winding 60 through conductor 61 and arm 47 to contact 57 and thence through conductor 75 to one side of the solenoid coil 31 of valve 29 and through conductor 76 to conductor 69 and thence back to the other side of the secondary winding 60. In this new setup the aim is to get the arm 47 of the selector switch 37 indexed back to the starting position for the commencement of a new cycle with the minimum delay and least amount of water used, and for that reason the arm 47 is caused to advance more rapidly than during all of the regeneration and now turns with the 100 gallon register gear 38 as compared with its previous slower movement with the 1000 gallon register gear 39. The water used during this brief interval is discharged to the drain through the valve 29 or may be used to refill the brine tank, and inasmuch as the valve 29 is connected with the supply line between the meter 12 and the softener, the meter registers this flow and accordingly advances the arm 47 of the selector switch 37 fairly quickly to the starting position. Finally the arm 47 rides off contacts 54, 56, and 57 simultaneously, thereby breaking the circuits through the solenoid coil 31 and through the coils of electromagnetic clutches 42a and 44a so that the valve 29 closes and the softener along with its meter 12 and selector switch 37 is in readiness for the commencement of the next cycle of operation. It should be understood in passing that although we have illustrated as the source of potential a secondary winding 60 of a transformer whose primary winding is indicated at 60' connected across an alternating current line, we do not limit ourselves to the use of alternating current inasmuch as the invention will operate equally as well with direct current.

Figure 3B:
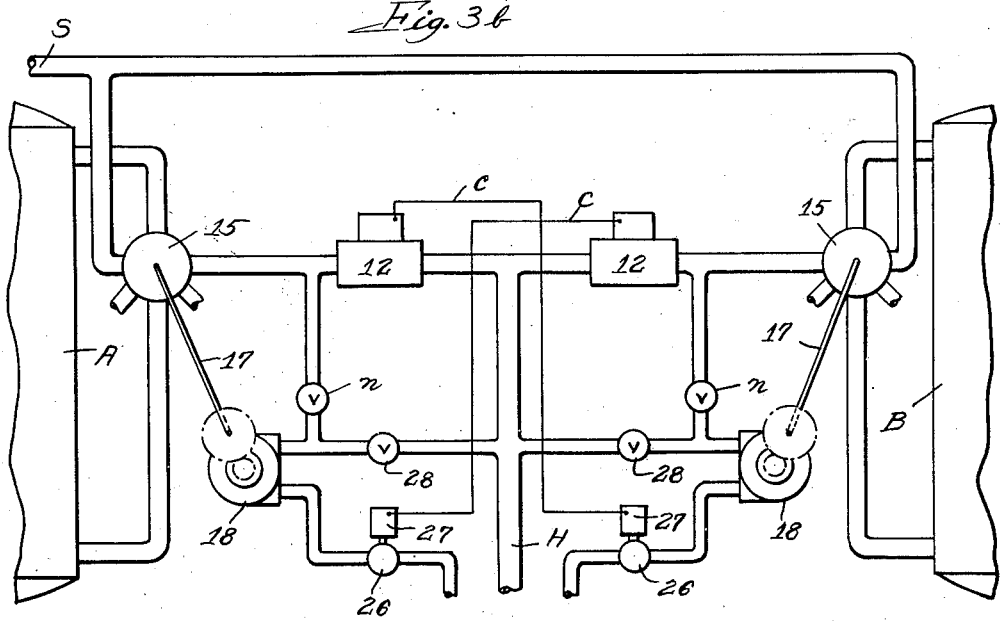
Fig. 3b is a diagram similar to Fig. 3a but showing the application thereto of a modification of the arrangement of Fig. 1.

While we have shown the motor 18 as connected to the supply line on the inlet side of the meter 12 at pipe 13, we do not limit ourselves to such an arrangement inasmuch as the motor 18 may be connected to the pipe 14 on the outlet side of the meter 12, as in Fig. 3b, so that all of the water flowing through the valve 26 in the operation of the motor 18 to operate the valve 15 will cause movement of the arm 47 of the selector switch 37. Such an arrangement has certain advantages, the principal one being that where the valve 29 is dispensed with in a single unit installation, the arm 47 of the selector switch 37 will by reason of the continued operation of the meter 12 as the water flows through the meter to the motor 18 and out through the valve 26 be sure to ride off the contact 72 at the end of the regeneration, leaving the valve 15 in service position ready for the commencement of another capacity run. The valve 29 can be dispensed with if the motor 18 is connected on the discharge side of the meter 12, and with such an arrangement in a double unit installation, as illustrated in Fig. 3b, when the softener or filter that is in operation is nearly exhausted, the selector switch 37 of its meter will complete a circuit through the coil 27 of the valve 26 associated with the valve mechanism 15 of the other softener or filter, instead of completing a circuit through the coil 31 of the valve 29 as previously described. In that way, the valve mechanism 15 is thrown into operation directly instead of being thrown into operation after a short interval of time when the meter completes a circuit through the valve 26 as previously described.

Referring to Fig. 3a, A and B designate the two softeners in a double unit installation with H designating the hard water supply line and S the soft water service line, conductors C cross connect the coils of the valves 29 with the selector switches 37 on the meters of the two softeners so that the valve 29 of the softener B will be opened from the meter 12 of the softener A and the valve 29 of the softener A will be opened from the meter 12 of softener B, in line with what was previously described in the discussion of Fig. 1. Before describing the operation, however, it must be understood that both valves 15 will be of the type described in our copending application above mentioned, having an off position between rinsing and service positions, and that the interrupter disks 33 will have projections e between the projections d and f to correspond to the off position of the valves. It should also be understood that the contacts 56 and 57 on each of the selector switches 37 will be located at a point where they will be engaged by the arm 47 near the end of the capacity run, as for example is indicated by the dot and dash line x in Fig. 1. That is to say, if the softener A is operating and it is desired to have the softener B thrown into operation with it when the softener A has completed say 80% of its capacity run, then the contacts 56 and 57 will be located at a point ⅘ or 80% of the distance from the point contact 72 to the point contact 50, which is about where the line x is shown in Fig. 1. The idea is to have the regenerated unit B thrown into service with the nearly exhausted unit A for the remainder of the period of operation of the softener A before the softener A is to be regenerated, such operation having been found to give highest all around efficiency for reasons which need not be discussed here. In operation, assuming softener A is in service and softener B is idle with its valve in off position so that all of the incoming hard water from the line H is passed through softener A by its valve 15 and the softener A delivers the soft water to the service line S, when the meter 12 indicates 80% exhaustion of softener A, its switch 37 will complete a circuit through the coil of the valve 29 on softener B allowing hard water to pass through the meter 12 of that softener and out to the drain through the valve 29 even though the valve 15 of the softener B is in off position. Then when the switch 37 of the meter 12 of softener B has moved far enough from the point contact corresponding to the contact 72 in Fig. 1 to engage another contact indicated in dotted lines at 72' in Fig. 1, the circuit through coil 27 for the valve 26 will be completed and the valve 15 of softener B will be moved from off position to service position, the disk 33 in such operation moving from a point where the projection e engages the switch blade 58 to a point where the projection f engages said blade and breaks the circuit through the contacts 59. Of course, as soon as the valve 15 of softener B is in service position, a parallel circuit is established for the hard water from the line H through the softener B and soft water is discharged from both softeners A and B to the service line S until softener A completes its capacity run whereupon the meter 12 thereof throws the softener A into regeneration. After that softener A goes through regeneration in the manner previously described with reference to Fig. 1 except that the valve 15 of softener A is left in the off position at the conclusion of the regeneration. Then softener B continues to supply soft water until it reaches the predetermined state of exhaustion for which the contacts 56 and 57 on the selector switch 37 of its meter 12 are set, as previously described, whereupon a circuit is established through the coil of the valve 29 on softener A to throw the softener A eventually into service with softener B similarly as above described where softener A was in operation and softener B was idle.

Fig. 3b shows a similar installation except that the valves 29 are dispensed with and the motors 18 for the valves 15 are connected on the discharge side of the meters 12 instead of on the inlet side. Under these conditions, when the softener A reaches the 80% mark, the contacts 56 and 57 engaged by the arm 47 complete a circuit through the coil 27 of the valve 26 of softener B instead of completing a circuit through the coil 31 of the valve 29, as above described. The valve 15 for softener B is accordingly immediately turned from off position to service position, thus throwing softener B into service with softener A. The latter when softener A is completely exhausted and is thrown into regeneration and softener B is left operating by itself and eventually reaches the same degree of exhaustion previously reached by softener A, the selector switch 37 of meter 12 on softener B is arranged to complete a circuit through the coil 27 of valve 26 on softener A whereby to cause the valve 15 of softener A to be moved from off position to service position.

Figure 4A:
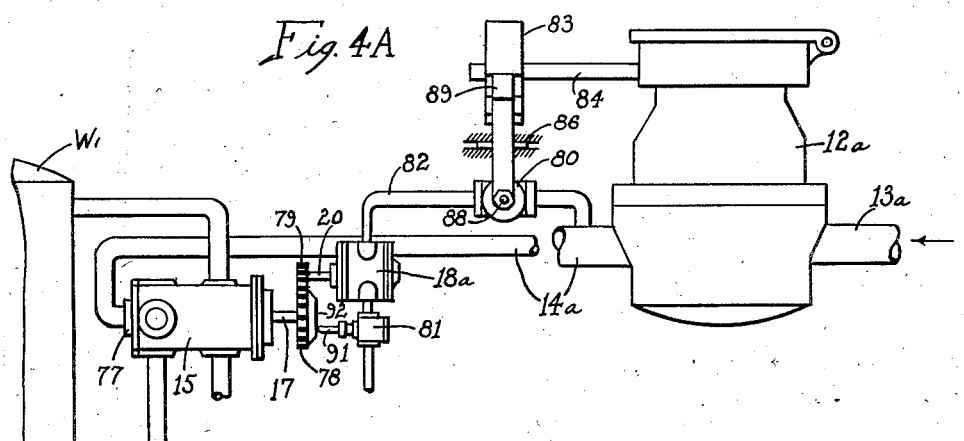
Fig. 4A is another more or less diagrammatic view of the mechanism of Fig. 4, shown in connection with a water treating system.

Figs. 4 to 7 illustrate another embodiment of our invention in which electrical means are eliminated and the operation is purely mechanical, the meter serving to operate a control cam or ratchet at a slow speed during that portion of the cycle corresponding to the capacity run in a water softener, filter, or the like, and at a faster speed during the rest of the cycle corresponding to the regeneration period in a water softener and the like. The cam so actuated is arranged to operate a pilot valve to start a hydraulic motor turning the valve mechanism, and another valve is connected in series with the pilot valve and rotor, which, when the valve mechanism has been operated to the desired predetermined position, closes and stops the operation of the motor, leaving the valve mechanism in its desired position. In this mechanical or hydromechanical embodiment of our invention, the switchover from low speed operation of the control cam to higher speed operation during the regeneration is accomplished automatically without any clutches like the clutches 42a—44a previously described. In these views the meter is indicated at 12a, and at 13a and 14a are indicated the inlet and outlet connections therefor in the water supply line going to a water softener, for example, indicated at W, in Fig. 4A. 15 is the valve mechanism into one end of which the pipe extending from the outlet connection 14a of the meter is adapted to be connected in accordance with the disclosure in our copending application previously mentioned, the end neck or boss being numbered 77. Some of the other bosses indicated on the valve 15 are for pipe connections leading to the top and bottom of the softener tank in a single-tank unit or to the bottom of the upflow tank and bottom of the downflow tank in the case of a double-tank upflow-downflow type softener, whereas the other bosses are for pipe connections going to the service system, the drain, brine tank, and so forth. The stem 17 serves to turn the piston type rotor of the valve 15 and has a gear 78 thereon meshing with the pinion 79 on the shaft 20 of the impeller of the hydraulic motor 18a. The pilot valve 80 has in conjunction therewith a shut-off valve 81, the two being connected in series in the drain line 82 connected to the outlet side of the meter 12a and adapted to control the starting and stopping of the motor 18a, and accordingly shift the valve 15 from one position to another. 83 is the cam or ratchet previously mentioned, the shaft 84 of which is driven at a higher or lower speed rate from the register gears 38a—41a or intermediate gears l in the meter 12a to advance the cam 83 slowly during the capacity run to a point where the follower 85 rides into the notch g to open the pilot valve 89 for the start of the regeneration. Substantially coincidentally the switch-over from lower to higher speed of operation is arranged to occur so that the cam 83 is advanced relatively quickly from notch g to notch h and thence to i, j, and k, the notch g marking the point at which the valve 15 is arranged to be turned from softening to first backwash position and so on through notches h, i, j, and k, which correspond to second backwash, brining, rinsing, and finally return to softening position. The follower 85 is diagrammatically illustrated as pivoted intermediate its ends at 86 and as having a loose pivotal connection at one end 87 with the stem 88 of the pilot valve and counter-balanced or otherwise loaded at its other end, as at 89, sufficiently to overcome easily the resistance toward opening of the valve 89 when the follower drops into one of the notches g—k. The shut-off valve 81 has a spring 90 tending normally to close the same, and the stem 91 of this valve engages a cam disk 92 turning with the rotor of the valve 15 and having recesses 93 in circumferentially spaced relation on the face thereof into which the stem 91 is arranged to ride so as to allow the shut-off valve 81 to close when the valve 15 has been moved to any one of its various operating positions. The web 94 of the shut-off valve, as shown in Fig. 4, has a bleeder port 95 therein which, as will soon appear, plays an important part in the operation in conjunction with the pressure-responsive vent valve 96 in the casing of the hydraulic motor 18a. The shaft 84 for operating the cam 83, as shown in Fig. 6, is arranged to be driven by either of two sector gears 97 and 98, the former of which has drive transmitted thereto from the 100 gallon register gear 38a, and if desired from the 1,000 gallon register gear 39a, whereas the sector gear 98 is arranged to be driven off the 100,000 gallon register gear 41a. It should be understood, however, we may use the gears l instead. Any suitable or preferred means, like the bevel gears shown at 99 in Fig. 6, may be provided for transmitting drive selectively from either of the two sector gears to the shaft 84, the idea being to continue advancing the cam 83 through the medium of the sector gear 98 so long as low speed register gear 41a transmits drive to the sector gear 98 during the capacity run and thereafter pick up the drive from the higher speed register gear 38a, or 39a, as the case may be, the drive illustrated being from the gear 38a to the sector gear 97. It will be understood that the shaft 84 is turned in the same direction when driven from either of the two sector gears whereby to advance the cam 83 slowly through the capacity run and at a much faster rate through the regeneration period.

The section through the meter 12a shown in Fig. 5 illustrates the register gears 38a—41a in the upper housing of the meter and the intermediate gears l in the lower housing. The upper housing it is here assumed will contain the sector gears 97 and 98 and, if desired, the pilot valve 80 and its control cam 83 may be included in the same assembly, or at least the cam 83 with the follower 85, or its equivalent, engaging the same. Figs. 4 and 4A, however, show shaft 84 extending from the meter housing to operate the cam 83 outside the housing.

In operation, when the softener completes its capacity run the cam 83 reaches the position illustrated in Fig. 4 where the follower 85 rides into notch g. This marks the commencement of the regeneration period, and the sector gear 97 at or just prior to that point comes into play to drive the cam 83 at the faster rate required for regeneration, the sector gear 98 being thereupon disengaged. The pilot valve 80 is opened as a result of the dropping of the follower 85 into the notch g and water is delivered to the hydraulic motor 18a to turn the rotor of the valve 15 through the medium of the reduction gearing 79—78. The valve is turned through approximately 135° as determined by the location of the recesses 93 in circumferentially spaced relation on the cam 92, the shut-off valve 81 being closed when the stem 91 thereof drops down into the appropriate recess, accordingly stopping the motor 18a with the valve left in the first backwash position. At approximately the same instant that the shut-off valve 81 closes, the pilot valve 80 is also automatically closed by reason of the follower 85 having moved up the incline 83a back onto the short section of periphery 83b between the notches g and h. These inclines 83a for the different notches h, i, j, and k are all designed having due regard for the angularity through which the valve rotor is to be moved and accordingly the amount of water required by the hydraulic motor 18a, so that the pilot valve 80 will close when the shut-off valve 81 closes at the time the valve rotor has been turned through a predetermined angle. While the valve is in backwash position, the meter 12a measures the water flowing through the softener and during this interval the follower 85 rides on the periphery 83f of the cam 83 between the notches g and h, and, of course, it will be understood that each of these "dwells" on the cam is likewise laid out so that there is sufficient allowance for water flow during the different phases of regeneration, such as first backwash, second backwash, and so forth. Now, before stating what occurs when the follower 85 drops into the next notch h to start the motor 18a turning the valve from first backwash to second backwash position, we want to point out how the motor 18a and shut-off valve 81 are in the meantime made ready. It will be recalled that when the valve 15 reached first backwash position, the stem 91 dropped into a notch 93 to close the shut-off valve 81 and that at about the same instant the pilot valve 80 closed. Promptly following the closing of the shut-off valve 81, the pressure in the line 82 is relieved through the bleeder hole 95, the outgoing water passing to the drain in the same way as the water previously passed through the motor. Upon relief of pressure, the vent 96 opens and allows air to enter the casing of the motor 18a so that the water drains therefrom through the bleeder hole 95 until the valve 81 and motor 18a and their connecting pipes are all drained to the level of the bleeder hole 95, which takes only a few minutes. This drainage may or may not include the vertical pipe 82 to the pilot valve 80 depending upon conditions, but it will suffice to say that a sufficient void is created so that when the follower 85 drops into the next notch h and the pilot valve 80 opens, there can be a sufficient inrush of water into the motor 18a to start turning the rotor of the valve 15 far enough to raise the stem 91 of the shut-off valve 81 by engagement with the inclined side 93a of whichever recess 93 it happens to be engaged in at the time, whereby to open promptly, or partially open, the shut-off valve 81 so that the hydraulic motor 18a can attend to the turning of the valve to the next position. Thus, when the follower 85 drops into the notch h, the first surge of water at least partially opens the shut-off valve 81 when the motor 18a starts turning the valve 15, and the valve 15 is thereupon turned through approximately 45° to the second backwash position, at which point the stem 91 drops into the next recess 93, closing the shut-off valve 81 at substantially the same instant that the pilot valve 80 closes as the follower 85 again rides out of the notch h onto the periphery of the cam 83. The second backwash continues until the follower 85 drops into notch i at which point the valve 15 is automatically turned to brining position through the medium of the pilot valve 80 and shut-off valve 81 similarly as just described for the second backwash movement. Then the brining flow is continued until follower 85 drops into notch j whereupon the valve 15 is turned from brining position to rinsing position again through the medium of pilot valve 80 and shut-off valve 81 working, of course, in conjunction with the hydraulic motor 18a. The rinsing flow continues until the follower 85 drops into notch k whereupon the valve 15 is indexed back to softening position for the start of the next cycle. At about the same point where the follower 85 rides out of notch k onto the long dwell on the cam 83, leaving the valve 15 in softening position, the sector gear 97 comes out of mesh with the register gear 38a, or 39a, as the case may be, and register gear 41a takes over the drive with sector gear 98, so that the cam 83 will be turned very slowly during the capacity run.

Referring now to Figs. 8 to 10, we have illustrated here another mechanical or hydromechanical mechanism in which the hydraulic phase is utilized only for intermittently connecting the valve mechanism to be operated with the meter for operating the same. The hydraulic control involves the use of a rotary control disk operated at a slow speed during the capacity run by one of two meter operated sector gears, and at a faster speed during the regeneration by the other meter operated sector gear, and this disk is arranged as it turns to open and close a pressure port communicating with a pressure responsive clutch operating device to connect the valve with the meter to operate the valve when a predetermined amount of water has passed through the meter to the softener, filter, or other unit controlled by the valve, the disk also automatically opening a pressure relief port when the valve has been operated through a desired angularity so as to mechanically disconnect the valve from the meter. The meter is indicated at 12b, and at 13b and 14b are the inlet and outlet connections therefor connected in the supply line to the softener or other unit W₂ connected with the valve 15. The latter is the same valve previously mentioned, having a piston type rotor operated by the stem 17. In this case a bevel gear 100 is arranged to transmit drive to the rotor of the valve 15 when the bevel gear 101 is meshed with the bevel gears 100 and 102. Reduction gears 103 and 104 are arranged to transmit drive to the bevel gears 100—102 from the meter operated shaft 105 so as to turn the valve from the meter whenever the bevel gear 101 is meshed with the bevel gears 100 and 102. The shaft 105 we prefer to drive from one of the intermediate gears l of the meter so as to divide the power of the meter between this drive and the driving of the control valve driven by the register gears. We have shown in Fig. 8 a pressure responsive diaphragm 106 in the pressure chamber 107 for moving the bevel gear 101 by means of its shaft 108 into mesh with the bevel gears 100 and 102 against the action of a return spring 109. The diaphragm carries a collar 106′ which receives an enlarged end portion of shaft 108 to provide a swivel operating connection so that the gears can be meshed by hydraulic pressure without interfering with the gears turning. It is, therefore, only when fluid under pressure is delivered to the chamber 107 through the pipe 110 that the valve 15 will be operated from the meter; when the pressure is relieved, the spring 109 will automatically disconnect the valve from its mechanical driving connection with the meter. The two bevel gears 38b and 41b correspond to the 100 gallon and 100,000 gallon register gears 38 and 41 respectively, or 38a and 41a respectively. The bevel sector gears 97a and 98a on the shaft 84a correspond to the sector gears 97 and 98 respectively in the last form of our invention described. It is, therefore, clear that while the sector gear 98a is in mesh, the sector gear 97a is out of mesh and that the sector gear 98a turns the shaft 84a very slowly throughout the capacity run, whereas the sector gear 97a which assumes the drive at the commencement of the regeneration period turns the shaft 84a in the same direction but at a much faster speed. A control disk 111, as shown in Fig. 8, is keyed to the shaft 84a to rotate between two other disks 112 inside a casing 113. The disk 111 may be metallic and the disks 112 of hard rubber or composition material, or of any other dissimilar material suitable for the purpose. Now, the disks 112 have two diametrically opposed ports 114 and 115 provided therein on the same radius from the center holes 116 and shaft 84a therein. The disk 111 has a series of ports 117 provided therein in circumferentially spaced relation at the same radius as the ports 114 and 115 so as to register therewith, one at a time, as the disk 111 rotates with respect to the disks 112 in the turning of the shaft 84a. Inspection of Fig. 9 will show that none of the ports 117 is diametrically opposed to another, and for that reason when one of the ports 117 is registering with ports 114, pressure is admitted through pipe 112 to the pipe 110 previously mentioned so as to move the diaphragm 106 and cause engagement of bevel gear 101 with the bevel gears 100 and 102. On the other hand, when another port 117, nearly diametrically opposed to the particular port which had just been in register with the ports 114 comes into register with the ports 115, the pressure in the pipe 110 is relieved through the branch 110′, which under those conditions is placed in communication with the drain pipe 119 that is open to the atmosphere. The ports 117 in the disk 111 are so spaced in relation to one another and having due regard to the fact that the disk turns slowly through one portion of a complete turn for the capacity run and at a greatly increased rate of speed through the rest of the turn during the regeneration period, so that the valve 15 will remain in softening position throughout the capacity run with the meter operated shaft 105 turning idly and then when the capacity run is completed, pressure is admitted through ports 114 as a result of registration of one of the ports 117 therewith to cause engagement of the gear 101 with the gears 100 and 102. The high ratio gear 97a at this time goes into play and accordingly turns the disk 111 fast enough so that the port 117 moves out of register with the ports 114 and another port 117 moves into registration with the ports 115 soon enough to stop the rotation of the valve 15 before it has moved past the first backwash position. Thereafter the subsequent operations of the valve 15 for the second backwash, brining, and rinsing, and finally return to softening position are accomplished in a similar manner, that is, by registration of a port 117 in the disk 111 with the ports 114 to bring about connection of the valve 15 with the meter 12b, after which the valve is turned only until another port 117 comes into register with the ports 115 to relieve the pressure in the pipe 110 and cause the valve 15 to be disconnected from the meter drive.

Figs. 11, 11A and 12 show still another mechanical or hydromechanical mechanism, which is a combination of the pilot valve-shutoff valve type of mechanism shown in Fig. 4 with the hydraulically operated gear shift mechanism shown in Fig. 8. In this mechanism the valve 15 is arranged to be operated by a hydraulic motor 18c under the control of a pilot valve 80a and shutoff valve 81a, the pilot valve 80a being controlled by a cam or ratchet 83a on a shaft 84b operated from the meter which measures the flow of water or other fluid through the unit W₃ connected with the valve 15. Only the register gears 38c and 41c of said meter are illustrated in Figs. 11 and 12, 38c being the 100 gallon register gear, and 41c being the 100,000 gallon register gear. Throughout the capacity run, the gear 41c drives the shaft 84b through bevel gears 44c, but at the end of the capacity run the bevel gears 42c are arranged to be thrown into mesh by reason of the closing of a pilot valve 80b by means of a cam 83b also carried on the shaft 84b. The pilot valve 80b controls communication between the pressure line 110a and the drain pipe 119a through the branch pipe 110b. When the pilot valve 80b is closed during the time that water is delivered from the supply or meter line through pipe 120 and pipe 82 under pressure to the hydraulic motor 18c to operate the valve 15, the diaphragm 106a in the pressure chamber 107a moves the shaft 84b against the action of the spring 109a to shift the gears 42c and 44c so as to drive the shaft 84b at a faster rate of speed from the register gear 38c during the regeneration period. The check valve 121 in the pipe 110a serves to trap the fluid in the pressure chamber 107a so as to keep the gears 42c engaged throughout the regeneration period, it being remembered that the pipe 82 is opened to the atmosphere through the bleeder hole 95 and vent 96 after each operation of the valve 15, as previously described in the description of Fig. 4. In the present construction there is an additional vent 122 provided in the stem 88 of the valve 80a, as indicated in Fig. 11, to open the pipe 82 to the atmosphere from end to end when the valve 80a closes and thus facilitate the drainage of water from the motor 18c and pipe 82 for the purpose previously described.

Fig. 12 illustrates the operation: The valve 80b is closed by reason of the cam 83b having turned to the position shown, and the diaphragm 106a has shifted the shaft 84b against the action of spring 109a to engage the bevel gears 42c and disengage the bevel gears 44c. The check valve 121 after admitting the water under pressure to the chamber 107a closes as shown and traps the water in the chamber and pipes 110a and 110b so that the opening of pipe 82 to the atmosphere when the valves 80a and 81a close will not result in unmeshing of the bevel gears 42c, but those gears will remain meshed throughout the regeneration period, until the cam 83b has turned through approximately 180° and allowed the valve 80b to open. When that occurs the branch pipe 110b is opened to the atmosphere through the drain pipe 119a and the spring 109a returns the diaphragm to normal position, shifting the shaft 84b back to the position shown in Fig. 11 so that the bevel gears 42c are disengaged and the bevel gears 44c are reengaged. The cam 83a has meanwhile been turned through approximately 180° along with the cam 83b, since both cams are on the shaft 84b, and the mechanism is therefore in readiness for the commencement of the capacity run, as shown in Fig. 11.

It is believed the foregoing description conveys a good understanding of the objects and advantages of our invention. The appended claims have been drawn with a view to covering all legitimate modifications and adaptations.

We claim:

1. In a water treating apparatus, the combination with a conduit for supplying water to a water treating device, and valve mechanism for controlling the admission and direction of flow of fluid through the device, said valve mechanism being shiftable from a service position through a series of regeneration positions and back to service position, of a meter for measuring the flow of water to the device through said first named conduit, a hydraulically operable motor operatively connected with the valve mechanism to operate the same from one position to another, a conduit connecting said motor to a source of liquid under pressure, a valve controlling the flow of liquid from said last named conduit through said motor to start and stop the operation of the valve mechanism by said hydraulic motor, means operated successively by the meter in each series of movements of the valve mechanism for automatically opening the valve each time when a predetermined amount of water has passed through the meter, and means operated by the valve mechanism for automatically closing the aforesaid valve when the valve mechanism has been moved a predetermined distance.

2. In a water treating apparatus, the combination with a conduit for supplying water to a water treating device, and valve mechanism for controlling the admission and direction of flow of fluid through the device, said valve mechanism being shiftable from a service position through regeneration positions and back to service position, of a meter for measuring the flow of water to the device through said first named conduit, a hydraulically operable motor operatively connected with the valve mechanism to operate the same from one position to another, a conduit connecting said motor to a source of liquid under pressure, a valve controlling the flow of liquid from said last named conduit through said motor to start and stop the operation of the valve mechanism by said hydraulic motor, a source of electric current supply including an electric circuit, electric solenoid means in said circuit for operating said valve, means operated successively by the meter in each series of movements of the valve mechanism for automatically closing the electric circuit through the solenoid means each time when a predetermined amount of water has passed through the meter, and means operated by the valve mechanism for maintaining the circuit through said solenoid means intact until the valve mechanism has been moved through a predetermined distance.

3. In a water treating apparatus, the combination with a conduit for supplying water to a water treating device, and valve mechanism for controlling the admission and direction of flow of fluid through the device, said valve mechanism being shiftable from a service position through regeneration positions and back to service position, of a meter for measuring the flow of water to the device through said first named conduit, a hydraulically operable motor operatively connected with the valve mechanism to operate the same from one position to another, a conduit connecting said motor to a source of liquid under pressure, a valve controlling the flow of liquid from said conduit through said motor to start and stop the operation of the valve mechanism by said hydraulic motor, a source of electric current supply including an electric circuit, electric solenoid means in said circuit for operating said valve, a selector switch successively operable for completing the electric circuit through the solenoid means at each one of a series of positions to which the switch is moved, means driven by the meter to move the switch to said different positions, whereby to start the operation of the valve mechanism by the hydraulic motor, and a relay switch also in said circuit operable by the valve mechanism to complete an auxiliary circuit from the source of electric current supply through the solenoid means after the valve mechanism has started moving and to maintain such circuit until the valve mechanism has been moved through a predetermined distance.

4. A water treating apparatus as set forth in claim 3 wherein the means driven by the meter and adapted to transmit drive to the selector switch includes a plurality of different ratio drive means between said meter and said selector switch for driving the selector switch relatively slowly during the service run and relatively faster during the regeneration period, and means for automatically rendering one or another of said drive means operative, depending upon the position of the selector switch.

5. A water treating apparatus as set forth in claim 3 wherein the means driven by the meter and adapted to transmit drive to the selector switch includes a plurality of different ratio drive means between said meter and said selector switch for driving the selector switch relatively slowly during the service run and relatively faster during the regeneration period, and electromagnetic clutch means for automatically rendering one or another of said drive means operative, depending upon the position of the selector switch, said selector switch controlling electric circuits from the source of electric current supply through said electromagnetic clutches.

6. In a water treating apparatus, the combination with a conduit for supplying water to a water treating device, and valve mechanism for controlling the admission and direction of flow of fluid through the device, said valve mechanism being shiftable from a service position through regeneration positions and back to service position, of a meter for measuring the flow of water to the device through said first named conduit, a hydraulically operable motor operatively connected with the valve mechanism to operate the same from one position to another, a valve controlling the flow of water from said first named conduit through said motor to start and stop the operation of the valve mechanism by said hydraulic motor, means operated successively by the meter in each series of movements of the valve mechanism for automatically opening the valve when a predetermined amount of water has passed through the meter, means operated by the valve mechanism for automatically closing the valve when the valve mechanism has been moved a predetermined distance, said hydraulic motor being operable by water delivered from the first named conduit upstream relative to and independently of the meter, another valve for discharging water from the first named conduit after it has passed through the meter, and means under control of the meter for opening and closing the last named valve.

7. In a water treating apparatus, the combination with a conduit for supplying water to a water treating device, and valve mechanism for controlling the admission and direction of flow of fluid through the device, said valve mechanism being shiftable from a service position through regeneration positions and back to service position, of a meter for measuring the flow of water to the device through said first named conduit, a hydraulically operable motor operatively connected with the valve mechanism to operate the same from one position to another, a valve controlling the flow of water from said first named conduit through said motor to start and stop the operation of the valve mechanism by said hydraulic motor, electric solenoid means for operating said valve, a source of electric current supply, including an electric circuit, means operated successively by the meter in each series of movements of the valve mechanism for automatically closing the electric circuit through the solenoid means when a predetermined amount of water has passed through the meter, means operated by the valve mechanism for maintaining the circuit through said solenoid means intact until the valve mechanism has been moved through a predetermined distance, said hydraulic motor being operable by water delivered from the first named conduit upstream relative to and independently of the meter, another valve for discharging water from the first named conduit after it has passed through the meter, electric solenoid means for operating the last named valve, and means under control of the meter for making, maintaining, and breaking an electric circuit from the source of electric current supply through said last named solenoid means.

8. In a water treating apparatus, the combination with a conduit for supplying water to a water treating device, and valve mechanism for controlling the admission and direction of flow of fluid through the device, said valve mechanism being shiftable from a service position through regeneration positions and back to service position, of a meter for measuring the flow of water to the device through said first named conduit, a hydraulically operable motor operatively connected with the valve mechanism to operate the same from one position to another, a valve controlling the flow of water from said first named conduit through said motor to start and stop the operation of the valve mechanism by said hydraulic motor, a source of electric current supply, including an electric circuit, electric solenoid means in said circuit for operating said valve, a selector switch operable successively for completing the electric circuit through the solenoid means at each one of a series of positions to which the switch is moved, means driven by the meter to move the switch to said different positions, whereby to start the operation of the valve mechanism by the hydraulic motor, said hydraulic motor being operable by water delivered from the first named conduit upstream relative to and independently of the meter, another valve for discharging water from the first named conduit after it has passed through the meter, and electric solenoid means in said circuit under control of the aforesaid selector switch for causing the opening of the last named valve when the selector switch reaches a certain position and for subsequently closing said valve after the meter has moved the selector switch through a predetermined additional movement.

9. A water treating apparatus as set forth in claim 8 wherein the means driven by the meter and adapted to transmit drive to the selector switch includes a plurality of different ratio drive means between said meter and said selector switch for driving the selector switch relatively slowly during the service run and relatively faster during the regeneration period, and means for automatically rendering one or another of said drive means operative, depending upon the position of the selector switch.

10. A water treating apparatus as set forth in claim 8 wherein the means driven by the meter and adapted to transmit drive to the selector switch includes a plurality of different ratio drive means between said meter and said selector switch for driving the selector switch relatively slowly during the service run and relatively faster during the regeneration period, and electromagnetic clutch means for automatically rendering one or another of said means operative, depending upon the position of the selector switch, said selector switch controlling electric circuits from the source of electric current supply through said electromagnetic clutches.

11. A water treating apparatus as set forth in claim 8 wherein the means driven by the meter and adapted to transmit drive to the selector switch includes a plurality of different ratio drive means between said meter and said selector switch for driving the selector switch relatively slowly during the service run, and at either one of two faster speeds during the regeneration period, and electromagnetic clutches for rendering one or another of said drive means operative, depending upon the position of the selector switch, said selector switch being operated at the fastest speed during its control of the circuit from the source of electric current supply through the second solenoid means.

12. In an automatic valve control mechanism, the combination with a valve mechanism, and a conduit through which fluid flow occurs in different positions of said valve mechanism, of a meter measuring the flow of fluid through said conduit, a fluid operable motor operatively connected with said valve mechanism for operating the same from one position to another, a conduit connecting said motor with a source of fluid under pressure, a valve controlling the flow of fluid from said last named conduit through said motor to start and stop the operation of the valve mechanism by said motor, means operated successively by the meter in each series of movements of the valve mechanism for automatically opening the valve each time when a predetermined amount of fluid has passed through the meter, and means operated by the valve mechanism for automatically causing closing of the aforesaid valve when the valve mechanism has been moved a predetermined distance.

13. In an automatic valve control mechanism, the combination with a valve mechanism, and a conduit through which fluid flow occurs in different positions of said valve mechanism, of a meter measuring the flow of fluid through said conduit, a fluid operable motor operatively connected with said valve mechanism for operating the same from one position to another, a conduit connecting said motor with a source of fluid under pressure, a valve controlling the flow of fluid from said last named conduit through said motor to start and stop the operation of the valve mechanism by said motor, a source of electric current supply, including an electric circuit, electric solenoid means in said circuit for operating said valve, means operated successively by the meter in each series of movements of the valve mechanism for automatically closing the electric circuit through the solenoid means each time when a predetermined amount of fluid has passed through the meter, and means operated by the valve mechanism for maintaining the circuit through said solenoid means intact until the valve mechanism has been moved through a predetermined distance.

14. In an automatic valve control mechanism, the combination with a valve mechanism, and a conduit through which fluid flow occurs in different positions of said valve mechanism, of a meter measuring the flow of fluid through said conduit, a fluid operable motor operatively connected with said valve mechanism for operating the same from one position to another, a conduit connecting said motor with a source of fluid under pressure, a valve controlling the flow of fluid from said last named conduit through said motor to start and stop the operation of the valve mechanism by said motor, a source of electric current supply, including an electric circuit, electric solenoid means in said circuit for operating said valve, a selector switch operable for completing the electric circuit through the solenoid means at each one of a series of positions to which the switch is moved, means driven by the meter to move the switch to said different positions, whereby to start the operation of the valve mechanism by the motor, and a relay switch operable by the valve mechanism to complete an auxiliary circuit from said electric current supply through the solenoid means after the valve mechanism has started moving and to maintain such circuit until the valve mechanism has been moved through a predetermined distance.

15. In an automatic valve control mechanism, the combination with a valve mechanism, and a conduit through which fluid flow occurs in different positions of said valve mechanism, of a meter measuring the flow of fluid through said conduit, a fluid operable motor operatively connected with said valve mechanism for operating the same from one position to another, a valve controlling the flow of fluid from said first named conduit through said motor to start and stop the operation of the valve mechanism by said motor, means operated successively by the meter in each series of movements of the valve mechanism for automatically opening the valve each time when a predetermined amount of water has passed through the meter, means operated by the valve mechanism for automatically closing the aforesaid valve when the valve mechanism has been moved a predetermined distance, said motor being operable by fluid delivered from the conduit upstream from the meter, another valve for discharging fluid from the conduit after it has passed through the meter, and means under control of the meter for opening and closing the last named valve.

16. In an automatic valve control mechanism, the combination with a valve mechanism, and a conduit through which fluid flow occurs in different positions of said valve mechanism, of a meter measuring the flow of fluid through said conduit, a fluid operable motor operatively connected with said valve mechanism for operating the same from one position to another, a valve controlling the flow of fluid from said first named conduit through said motor to start and stop the operation of the valve mechanism by said motor, a source of electric current supply, including an electric circuit, electric solenoid means in said circuit for operating said valve, means operated successively by the meter in each series of movements of the valve mechanism for automatically closing the electric circuit through the solenoid means each time when a predetermined amount of fluid has passed through the meter, means operated by the valve mechanism for maintaining the circuit through said solenoid means intact until the valve mechanism has been moved through a predetermined distance, said motor being operable by fluid delivered from the conduit upstream of the meter, another valve for discharging water from the conduit passed through the meter, electric solenoid means for operating the last named valve, and means under control of the meter for making, maintaining, and breaking an electric circuit from said electric current supply through said last named solenoid means.

17. In an automatic valve control mechanism, the combination with a valve mechanism, and a conduit through which fluid flow occurs in different positions of said valve mechanism, of a meter measuring the flow of fluid through said conduit, a fluid operable motor operatively connected with said valve mechanism for operating the same from one position to another, a valve controlling the flow of fluid from said conduit through said motor to start and stop the operation of the valve mechanism by said motor, a source of electric current supply, including an electric circuit, electric solenoid means in said circuit for operating said valve, a selector switch operable by the meter for completing the electric circuit through the solenoid means at each one of a series of positions to which the switch is moved by the meter following flow of predetermined amounts of fluid through the meter whereby to start the operation of the valve mechanism by the motor, said motor being operable by fluid delivered from the conduit upstream from the meter, another valve for discharging fluid from the conduit passed through the meter, and electric solenoid means in the aforesaid circuit under control of the selector switch for causing the opening of the last named valve when the selector switch reaches a certain position and for subsequently closing said valve after the meter has moved the selector switch through a predetermined additional movement.

18. In a water treating apparatus, the combination with a conduit for supplying water to a water treating device, and valve mechanism for controlling the admission and direction of flow of fluid through the device, said valve mechanism being shiftable from a service position through regeneration positions and back to service position, of a meter for measuring the flow of water to the device through said first named conduit, a hydraulically operable motor operatively connected with the valve mechanism to operate the same from one position to another, conduit means for conducting liquid through said motor connected with a source of liquid under pressure, two valves in said conduit means for controlling the flow of water through said motor, the first valve controlling the starting of the motor upon opening thereof, and the second controlling the stopping of the motor upon the closing thereof, means operated successively by the meter in each series of movements of the valve mechanism for opening and closing the first valve, and means operated by the valve mechanism for opening and closing the second valve.

19. An apparatus as set forth in claim 18, wherein the means for opening and closing the first valve comprises a cam and high and low ratio drive means driven by the meter for moving the cam relatively slowly during the service run and relatively faster during the regeneration period.

20. An apparatus as set forth in claim 18, wherein the second valve has a bleeder hole provided therein for relief of pressure in the line through the motor after the first and second valves have closed, and wherein the motor has a vent provided on the casing thereof arranged to open when the pressure in said motor is relieved whereby to permit drainage of water from the motor subsequent to each operation of the valve mechanism, substantially as and for the purpose described.

21. An apparatus as set forth in claim 18, including gears driven by the meter, the means operated by the meter for operating the first named valve comprising a cam, and a high ratio sector gear and a low ratio sector gear driven interchangeably by the meter driven gears and arranged to transmit drive selectively to the aforesaid cam whereby to turn the cam relatively slowly during the service run and relatively fast during the regeneration period.

22. An apparatus as set forth in claim 18, including means for automatically draining fluid from the conduit means connecting the first and second valves and motor when the valves are closed.

23. In an automatic valve control mechanism, the combination with a valve mechanism, and a conduit through which fluid flow occurs in different positions of said valve mechanism, of a meter measuring the flow of fluid through said conduit, a fluid operable motor operatively connected with said valve mechanism for operating the same from one position to another, conduit means for conducting liquid through said motor connected with a source of fluid under pressure, two valves in said conduit means for controlling the flow of fluid through said motor, the first valve controlling the starting of the motor upon opening thereof, and the second controlling the stopping of the motor upon the closing thereof, means operated by the meter for opening and closing the first valve, and means operated by the valve mechanism for opening and closing the second valve.

24. An apparatus as set forth in claim 23, including means for automatically draining fluid from the conduit means connecting the first and second valves and motor when the valves are closed.

25. An apparatus as set forth in claim 23, wherein the second valve has a bleeder hole provided therein for relief of pressure in the line through the motor after the first and second valves have closed, and wherein the motor has a vent provided on the casing thereof arranged to open when the pressure in said motor is relieved whereby to permit drainage of fluid from the motor subsequent to each operation of the valve mechanism, substantially as and for the purpose described.

26. In a water treating apparatus, the combination with a conduit for supplying water to a water treating device, and valve mechanism for controlling the admission and direction of flow of fluid through the device, said valve mechanism being shiftable from a service position through regeneration positions and back to service position, of a meter for measuring the flow of water to the device through said first named conduit, a hydraulically operable motor operatively connected with the valve mechanism to operate the same from one position to another, conduit means for conducting liquid through said motor connected with. a source of liquid under pressure, two valves in said conduit means for controlling the flow of water through said motor, the first valve controlling the starting of the motor upon opening thereof, and the second valve controlling the stopping of the motor upon the closing thereof, means operated by the meter for opening and closing the first valve, means operated by the valve mechanism for opening and closing the second valve, high and low speed gears driven by the meter, the means operated by the meter for operating the first valve being operable alternately by said gears, clutch means shiftable to connect said last mentioned means with either of said gears, and means operated by the meter for operating said clutch means.

27. In a water treating apparatus, the combination with a conduit for supplying water to a water treating device, and valve mechanism for controlling the admission and direction of flow of fluid through the device, said valve mechanism being shiftable from a service position through regeneration positions and back to service position, of a meter for measuring the flow of water to the device through said first named conduit, a hydraulically operable motor operatively connected with the valve mechanism to operate the same from one position to another, conduit means for conducting liquid through said motor connected with a source of liquid under pressure, two valves in said conduit means for controlling the flow of water through said motor, the first valve controlling the starting of the motor upon opening thereof, and the second valve controlling the stopping of the motor upon the closing thereof, means operated by the meter for opening and closing the first valve, means operated by the valve mechanism for opening and closing the second valve, high and low speed gears driven by the meter, the means operated by the meter for opening the first valve being operable alternately by said gears, clutch means shiftable to connect said means with either of said gears, pressure responsive means for operating the clutch means, and a valve operated by the meter for controlling the admission and release of pressure from a source of pressure fluid supply to said pressure responsive means.

28. An apparatus as set forth in claim 26, wherein the second valve has a bleeder hole provided therein for relief of pressure in the conduit means and the motor after the first and second valves have closed, and wherein the motor has a vent provided on the casing thereof arranged to open when the pressure in said motor is relieved whereby to permit drainage of liquid from the motor subsequent to each operation of the valve mechanism, substantially as and for the purpose described.

29. An apparatus as set forth in claim 26, wherein the second valve has a bleeder hole provided therein for relief of pressure in the conduit means and the motor after the first and second valves have closed, and the motor has a vent provided on the casing thereof arranged to open when the pressure in said motor is relieved whereby to permit drainage of liquid from the motor subsequent to each operation of the valve mechanism, and wherein the first valve has an atmospheric vent which is opened when the valve is closed, whereby to open the conduit means connecting the first and second valves and the hydraulic motor to the atmosphere from end to end.

30. An apparatus as set forth in claim 26, wherein the second valve has a bleeder hole provided therein, and wherein the first valve has an atmospheric vent arranged to be opened when the valve is closed, whereby to open the conduit means connecting the first and second valves and the hydraulic motor to the atmosphere from end to end when the two valves are closed.

31. An apparatus as set forth in claim 26, including means for automatically draining water from the conduit means connecting the first and second valves and the hydraulic motor when the valves are closed.

32. In a water treating apparatus, the combination with a conduit for supplying water to a water treating device, and valve mechanism for controlling the admission and direction of flow of fluid through the device, said valve mechanism being shiftable from a service position through regeneration positions and back to service position, of a meter for measuring the flow of water to the device through said first named conduit, a hydraulically operable motor operatively connected with the valve mechanism to operate the same from one position to another, conduit means for conducting liquid through said motor connected with a source of liquid under pressure, valve means in said conduit means controlling the flow of water through said motor to start and stop the operation of the valve mechanism by said hydraulic motor, means operated by the meter for automatically causing the opening of the valve means when a predetermined amount of water has passed through the meter, means operated by the valve mechanism for automatically causing closing of the valve means when the valve mechanism has been moved a predetermined distance, high and low ratio gears driven by the meter, a shaft arranged to be driven by either of said gears, said shaft operating the valve operating means, clutch means arranged to be shifted to connect the shaft with one of said meter driven gears and disconnect it from the other, and vice versa, pressure responsive means for operating the clutch means and including a pressure chamber, a pipe for delivering water under pressure to said chamber from the aforesaid conduit means, a check valve in said pipe for trapping water in said chamber, a valve for opening said pipe to the atmosphere connected thereto between the check valve and the pressure chamber, and means for opening and closing said valve operated by the aforesaid shaft.

33. An apparatus as set forth in claim 32, including means for automatically draining water from the conduit means connecting the valve means and the hydraulic motor when the valve means is closed.

34. In an automatic valve control mechanism, the combination with a valve mechanism, and a conduit through which fluid flow occurs in different positions of said valve mechanism, of a meter measuring the flow of fluid through said conduit, a fluid operable motor operatively connected with said valve mechanism for operating the same from one position to another, conduit means for conducting fluid through said motor connected with a source of fluid under pressure, two valves in said conduit means for controlling the flow of fluid through said motor, the first valve controlling the starting of the motor upon opening thereof, and the second valve controlling the stopping of the motor upon the closing thereof, means operated by the meter for opening and closing the first valve, means operated by the valve mechanism for opening and closing the second valve, high and low speed gears driven by the meter, the means operated by the meter for operating the first valve being operable alternately by said gears, clutch means shiftable to connect said means with either of said gears, and means operated by the meter for operating said clutch means.

CHESTER T. McGILL.
OMAR FRED DUBRUIEL.

CERTIFICATE OF CORRECTION.

Patent No. 2,310,978. February 16, 1943.

CHESTER T. McGILL, ET AL.

It is hereby certified that error appears in the printed specification of the above numbered patent requiring correction as follows: Page 9, second column, line 48, before the word "conduit" insert --last named--; and line 54, for "successively operable" read --operable successively--; page 11, second column, line 64, for "of" read --from--; and that the said Letters Patent should be read with this correction therein that the same may conform to the record of the case in the Patent Office.

Signed and sealed this 13th day of April, A. D. 1943.

(Seal)
Henry Van Arsdale,
Acting Commissioner of Patents.